United States Patent
Sen et al.

(10) Patent No.: US 6,303,723 B1
(45) Date of Patent: Oct. 16, 2001

(54) PROCESS FOR POLYMERIZATION OF ALLYLIC COMPOUNDS

(75) Inventors: Ayusman Sen; Shengsheng Liu, both of State College, PA (US)

(73) Assignee: Penn State Research Foundation, University Park, PA (US)

(*) Notice: Subject to any disclaimer, the term of this patent is extended or adjusted under 35 U.S.C. 154(b) by 0 days.

(21) Appl. No.: 09/428,608

(22) Filed: Oct. 27, 1999

Related U.S. Application Data

(60) Provisional application No. 60/105,903, filed on Oct. 28, 1998.

(51) Int. Cl.$^7$ ............................. C08F 2/06; C08F 4/04
(52) U.S. Cl. ...................... 526/211; 526/219; 564/160; 564/288
(58) Field of Search ............................ 526/211, 219; 564/160, 288

(56) References Cited

U.S. PATENT DOCUMENTS

| | | | |
|---|---|---|---|
| 3,888,928 | 6/1975 | Willis et al. | 260/570.9 |
| 3,990,958 | 11/1976 | Sasse | 204/159.22 |
| 4,121,986 | 10/1978 | Battaerd | 204/159.22 |
| 4,256,636 | 3/1981 | Roos et al. | 260/192 |
| 4,329,441 | 5/1982 | Bergthaller | 526/193 |
| 4,452,737 | 6/1984 | Schmidt et al. | 260/192 |
| 4,504,640 | 3/1985 | Harada et al. | 526/193 |
| 4,528,347 | 7/1985 | Harada et al. | 526/219 |
| 4,540,760 | 9/1985 | Harada et al. | 526/211 |
| 4,605,701 | 8/1986 | Harada et al. | 525/107 |
| 4,680,360 | 7/1987 | Ueda et al. | 526/310 |
| 4,713,431 | 12/1987 | Bhattacharyya et al. | 526/207 |
| 4,746,715 | 5/1988 | Dworczak et al. | 526/211 |
| 4,749,759 | 6/1988 | Shimizu et al. | 526/218.1 |
| 4,812,540 | 3/1989 | Kageno et al. | 526/218.1 |
| 4,864,007 | 9/1989 | Schleusener | 526/218.1 |
| 4,916,216 | 4/1990 | Tanaka et al. | 534/738 |
| 4,927,896 | 5/1990 | Blocker et al. | 526/93 |
| 4,950,742 | 8/1990 | Ichiriki et al. | 534/738 |
| 5,422,408 | 6/1995 | Cramm et al. | 526/219.2 |
| 5,665,843 | 9/1997 | Iio | 526/310 |

FOREIGN PATENT DOCUMENTS

| | | |
|---|---|---|
| 0 142 962 | 5/1985 | (EP) . |
| 0 197 022 A1 | 10/1986 | (EP) . |
| 0 280 445 A1 | 8/1988 | (EP) . |
| 0 398 490 A2 | 11/1990 | (EP) . |

OTHER PUBLICATIONS

Patent Abstracts of Japan, for Publication No. 09291493, Nov. 11, 1997, "Agent for Making Recording Paper Waterproof.".

Patent Abstracts of Japan, for Publication No. 11263813, Sep. 28, 1999, "Preparation of Allyltrialkylammonium Salt Copolymer and Allytrialkylammonium Salt Copolymer.".

Patent Abstracts of Japan, for Publication No. 62172007, Jul. 29, 1987, "Production of Low–Molecular–Weight Polymer of Monoallylamine Hydrochloride.".

Bolto, B.A. et al., "Synthesis of Cross–Linked Polyallylamines Which Are Resistant to Sulfite Attack," *J. Macromol. Sci.–Chem.* A17 (1): 153–166 (1982).

McLean, C.D. et al., "Cyclopolymerization. VI. Preparation and Properties of Crosslinked Polyamines by Cyclopolymerization," *J. Macromol. Sci. –Chem.* A10(5): 857–873 (1976).

VA–086 Technical Information, Wako Chemicals U.S.A., Inc. 1995.

V–50 Technical Information, Wako Chemicals U.S.A., Inc. 1994.

*Primary Examiner*—Johann Richter
*Assistant Examiner*—Brian J. Davis
(74) *Attorney, Agent, or Firm*—Hamilton, Brook, Smith & Reynolds, P.C.

(57) ABSTRACT

A process for preparing polymers of allylic amine compounds comprising:

a) preparing a reaction mixture comprising:
  i) a polar reaction solvent;
  ii) at least one salt of an allylic amine compound; and
  iii) a free radical initiator comprising a water soluble non-ionic diazo compound represented by:

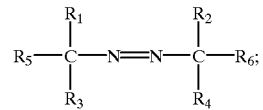

wherein: $R_1$, $R_2$, $R_3$ and $R_4$ are the same or different lower alkyl groups; $R_5$ and $R_6$ are each independently selected from the group consisting of hydroxyalkyl amide or hydroxyalkyl ester; and b) polymerizing the reaction mixture.

29 Claims, 1 Drawing Sheet

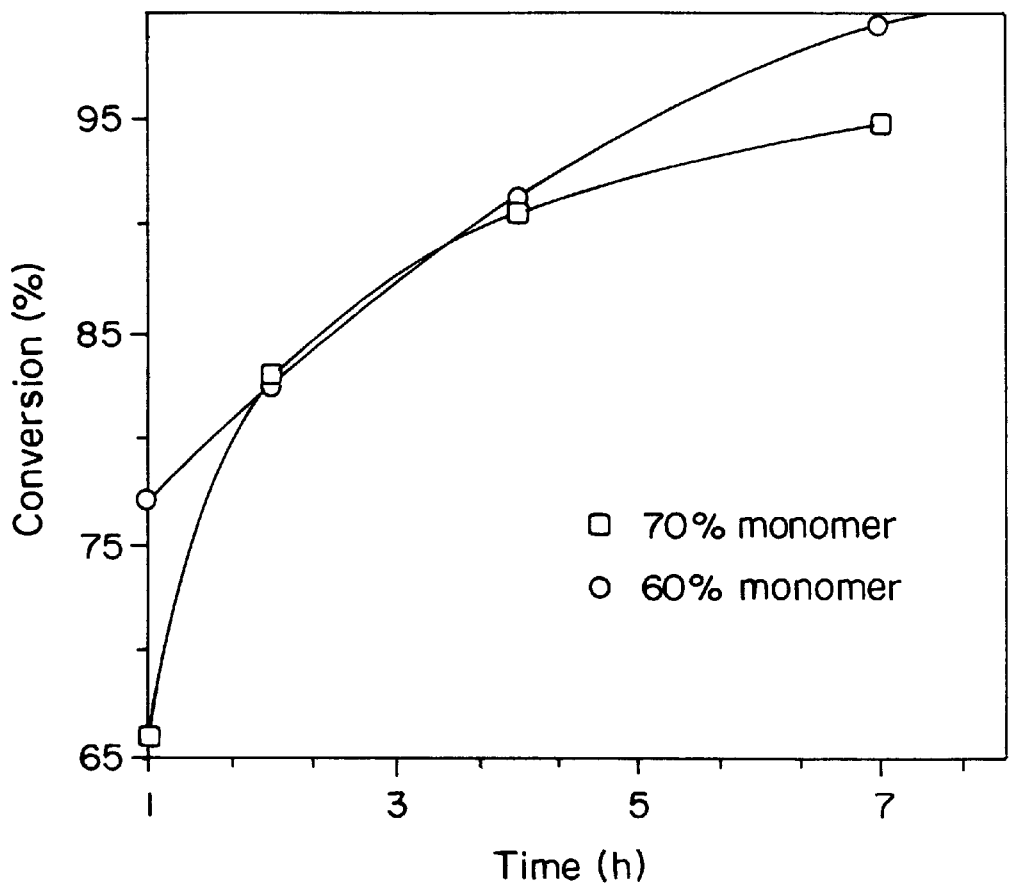

PROCESS FOR POLYMERIZATION OF ALLYLIC COMPOUNDS

RELATED APPLICATION

This application claims the benefit of U.S. Provisional Application No. 60/105,903 filed on Oct. 28, 1998, the entire teachings of which are incorporated herein by reference.

BACKGROUND OF THE INVENTION

Allylic and vinylic compounds can be polymerized via a free radical addition process. However, while vinyl monomers (e.g., acrylamide, acrylic acid, acrylic acid esters, vinylamine) can be easily polymerized to obtain polymers of suitable size and in high yield, the same is not true for allylic monomers. The difficulty encountered with the polymerization of allylic monomers is due primarily to the stability of allyl radicals relative to vinyl radicals. Consequently, an initiating radical often abstracts a H-atom from the allylic monomer rather than adding to the C=C bond, resulting in a competing self-termination reaction between the allylic hydrogen atoms and the initiating free radical often referred to as allylic degradative chain transfer. The same difficulties are encountered when allylic monomers are copolymerized with vinylic monomers. Thus, to polymerize allylic monomers large quantities of a free radical initiator are usually required, resulting in the production of low molecular weight polymers which comprise relatively high quantities of terminal catalyst residues. Polymers of allylamines (e.g., allylamine, diallylamine, triallylamine) are particularly difficult to prepare due to a further decreases the reactivity of the allylic bond in polymerization reactions and unwanted side-reactions, both resulting from the presence of the amino functionality.

Several processes for polymerizing allylamine which use cationic water soluble diazo free radical initiators and/or additives such as multivalent metal ions are known (see, for example, U.S. Patent Nos. 4,504,640, 4,540,760 and 4,528,347, to Harada et al.; 4,927,896 to Blocker et al.). However, improvements in the current processes for polymerizing allylamine are needed. For example, the cationic charge on a diazo free radical initiator can improve the solubility of the compound in water. However, the ionic charge can also destabilize the radicals generated upon decomposition of the initiator and thus may adversely affect the process (e.g., result in polymers having high polydispersity). Furthermore, regulators or additives (e.g., multivalent metal ions) can be difficult to remove from the final polymer products and can render the polymer unacceptable for many uses, such as in the pharmaceutical industry.

A need exists for a process for polymerizing allylic amine compounds which reduces or eliminates the referenced problems.

SUMMARY OF THE INVENTION

The invention related to a process for preparing polymers of allylic amine monomers. In one embodiment, the process comprises:

a) preparing a reaction mixture comprising:
  i) a polar reaction solvent;
  ii) at least one salt of an allylic amine compound; and
  iii) a free radical initiator comprising a water soluble non-ionic diazo compound represented by:

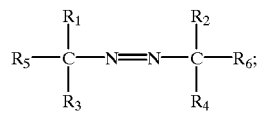

wherein:
$R_1$, $R_2$, $R_3$ and $R_4$ are the same or different lower alkyl groups;
$R_5$, and $R_6$ are each represented by

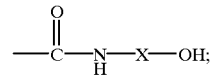

wherein X is a $C_1$ to $C_{12}$ alkylene group; and
b) polymerizing the reaction mixture.

The process can be used to prepare homopolymers of an allylic amine compound and to prepare copolymers comprising an allylic amine compound and one or more additional monomers. In one embodiment, the oxygen content of the reaction mixture is reduced to facilitate polymerization. In another embodiment, the solvent has a pH of less than about 3. In another embodiment, the invention is a process for polymerizing an allylic amine, for example, allylamine, diallylamine, triallylamine or combinations thereof. In another embodiment, the invention is a process for copolymerizing an allylic amine and a multifunctional comonomer to prepare a crosslinked polymer.

BRIEF DESCRIPTION OF THE DRAWING

The FIGURE is a graph illustrating the relationship between conversion of allylamine monomers into polymers and polymerization time. The allylamine monomers were polymerized using the non-ionic water soluble diazo-type free radical initiator 2,2'-azobis[2-methyl-N-(2-hydroxyethyl)propionamide].

DETAILED DESCRIPTION OF THE INVENTION

The invention relates to a process for preparing polymers of allylic amine compounds. Polymers produced in accordance with the invention have many uses. For example, the polymers can be used as pharmaceutical agents to bind ions (e.g., bile acid salts and conjugates, phosphate, oxalate) present in the gastrointestinal tract of a mammal and thereby prevent the absorption of the ions. Such methods are described in, for example, U.S. Patent Nos. 5,624,963, 5,703,188, 5,679,717, 5,693,675, 5,607,669, 5, 496,545, 5,667,775 and in WO98/29107, WO98/57652, WO99/22721, WO99/22743 and WO099/22744.

In one embodiment, the process comprises:
a) preparing a reaction mixture comprising:
  ii) a polar reaction solvent;
  ii) at least one salt of an allylic amine compound; and
  iii) a free radical initiator comprising a water soluble non-ionic diazo compound; and
b) polymerizing the reaction mixture.

As used herein, an "allylic amine compound" is a compound in which one or more allyl groups are covalently bonded to an amino nitrogen atom. The amino nitrogen can be a primary, secondary, tertiary or quaternary nitrogen atom. Thus, allylic amine compounds include, for example, allylamine, diallylamine, triallylamine, tetraallyl ammonium and compounds represented by Structural Formulae I, II and III.

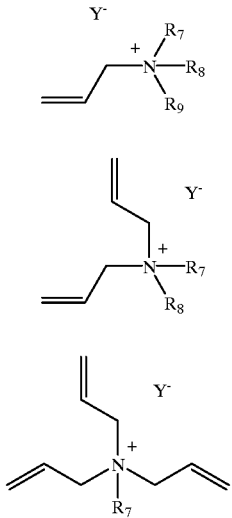

In Structural Formulae I, II and III, $R_7$, $R_8$ and $R_9$ can each, independently, be —H, a substituted or unsubstituted aryl group, a substituted or unsubstituted aralkyl group, a substituted or unsubstituted linear, branched or cyclic alkyl group, or any two of $R_7$, R8 and $R_9$ taken together with the nitrogen atom to which they are bonded can form a substituted or unsubstituted four to ten membered heterocyclic ring containing one or more heteroatoms. $Y^-$ is a suitable negatively charged counter ion as described herein. When at least one of $R_7$, $R_8$ and $R_9$ is —H the compound can be in the corresponding unprotonated form. Compounds which are represented by Structural Formulae I–III include, for example, monoallylamine, N-methylallylamine, N-ethylallylamine, N-n-propylallylamine, N-isopropylallylamine, N-n-butylallylamine, N-sec-butylallylamine, N-tert-butylallylamine, N-isobutylallylamine, N-cyclohexylallylamine, N-benzylallylamine, diallylmethylamine, diallyldimethylammonium bromide, N,N-diallylmorpholine, N,N-diallylpiperidine and the like. Preferred allylic amine compounds are monoallylamine and diallylamine.

Polymerization is carried out in a suitable polar solvent. Suitable solvents include, for example, water, inorganic acids (e.g., hydrochloric acid, hydrobromic acid, hydrofluoric acid, hydriodic acid, sulfuric acid, sulfurous acid, phosphoric acid, nitric acid) or aqueous solutions thereof, organic acids (e.g., acetic acid, formic acid, propionic acid) or aqueous solutions thereof, alcohols (e.g., methanol, ethanol, butanol) or aqueous solutions thereof, or aqueous solution of water miscible organic solvents, such as dimethylsulfoxide, dimethylformamide, acetone and the like. Preferably, the polar solvent is acidic.

In one embodiment, the reaction mixture can have a pH of less than about 5. In another embodiment, the reaction mixture can have a pH of less than about three. In a preferred embodiment, the solvent is an aqueous solution of an inorganic acid, and the reaction mixture has a pH of less than about one. In a particularly preferred embodiment, the solvent is a aqueous solution of hydrochloric acid, and the reaction mixture has a pH between about 0.3 and about 0.8. It is understood that the reaction mixture can have a pH of less than zero.

The allylic amine salt can be added to the polar reaction solvent, or can be prepared in situ by dissolving the free base of an allylic amine in a reaction solvent that contains a sufficient quantity of acid to convert the free base into an acid addition salt. The resulting acid addition salt can comprise a negatively charged counter ion that is the conjugate base of the acid used to prepare the solution. Preferably, the allylic amine salt comprises a counter ion selected from chloride, bromide, fluoride, sulfate, phosphate and a carboxylate anion (e.g., acetate).

The process can be used to prepare co-polymers. For example, in addition to a salt of an allylic amine the reaction mixture can further comprise one or more additional monomers which can be polymerized by free radical addition. Examples of additional monomers which are suitable for use in the process of the invention include, for example, allylic amines (e.g., diallylamine, triallylamine, diallyldimethylammonium chloride), allyl alcohol, vinyl alcohol, vinylamine, ethylene oxide, propylene oxide, substituted and unsubstituted acrylates and methacrylates, such as hydroxyethylacrylate, hydroxyethylmethacrylate, hydroxypropylacrylate, hydroxypropylmethacrylate, poly(propyleneglycol) monomethacrylate, poly(ethyleneglycol) monomethacrylate, acrylamide, methacrylamide, acrylic acid aminoalkyl(meth)acrylates and vinylimidazole. In one embodiment, the additional monomer is a multifunctional co-monomer and the polymer produced is crosslinked. Multifuntional co-monomers which are suitable for use in the process of the invention comprise two or more terminal olefin bonds and include, for example, polyvinylarenes, such as divinylbenzene, diacrylates, triacrylates, and tetraacrylates, dimethacrylates, diacrylamides, diallylacrylamides, and dimethacrylamides. Specific examples include ethylene glycol diacrylate, propylene glycol diacrylate, butylene glycol diacrylate, ethylene glycol dimethacrylate, butylene glycol dimethacrylate, methylene bis(methacrylamide), ethylene bis(acrylamide), ethylene bis(methacrylamide), ethylidene bis(acrylamide), ethylidene bis(methacrylamide), pentaerythritol tetraacrylate, trimethylolpropane triacrylate, bisphenol A dimethacrylate and bisphenol A diacrylate.

The amount of allylic amine salt in the reaction mixture can be about 10% to about 90%, preferably about 40% to about 90%, more preferably about 50% to about 70%, by weight based upon the total weight of the reaction solution. In a particularly preferred embodiment, the amount of allylic amine salt in the reaction mixture is about 60% by weight. When the solvent comprises a plurality of monomers, the ratio of the monomers can be adjusted to produce a polymer of the desired composition.

The water soluble nonionic diazo-type free radical initiator used in the process of the invention is represented by Structural Formula IV.

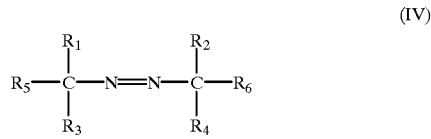

$R_1$, $R_2$, $R_3$ and $R_4$ are the same or different lower alkyl groups.

$R_5$, and $R_6$ are each, independently selected from the group consisting of hydroxyalkylamides and hydroxyalkyl esters represent by Structural Formulae V and VI, respectively.

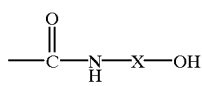

(V)

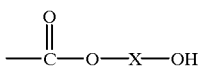

(VI)

X is a $C_1$ to $C_{12}$ alkylene group.

As used herein, the term "lower alkyl group" refers to substituted or unsubstituted straight chain, branched or cyclic groups comprising one to about ten carbon atoms. One or more carbon atoms in a lower alkyl group can be replaced by a heteroatom such as oxygen, sulfur or nitrogen, provided that the resulting diazo-type free radical initiator is non-ionic. For example, $R_1$, $R_2$, $R_3$ and/or $R_4$ can be a $C_2$ to $C_9$, alkoxyalkylene group.

In one embodiment, the water soluble non-ionic diazo-type free radical initiator is a compound represented by Structural Formula IV wherein $R_5$ and $R_6$ are represent by Structural Formula VI. Such compounds are generically referred to as azo-bis-N,N'-isobutyric acid hydroxyalkyl esters.

In a preferred embodiment, the water soluble non-ionic diazo-type free radical initiator is a compound represented by Structural Formula IV wherein $R_5$ and R6 are represented by Structural Formula V. Such compounds are generically referred to as azo-bis-N,N'-isobutyric acid hydroxyalkyl amides and can be prepared according to the methods described by Dworczak, et al., U.S. Pat. No. 4,746,715, the entire teachings of which are incorporated herein by reference.

In a particularly preferred embodiment, the water soluble non-ionic free radical initiator is represented by Structural Formula IV wherein $R_1$, $R_2$, $R_3$ and $R_4$ are each methyl, and $R_5$ and $R_6$ are each represented by Structural Formula V wherein X is ethylene. This preferred initiator, 2,2'-azobis[2-methyl-N-(2-hydroxyethyl)propionamide], is also known by the trade name VA-086 (Wako Chemicals USA, Richmond, Va.).

The amount of water soluble diazo-type free radical initiator added to the reaction mixture can be from about 0.1% to about 10%, preferably 0.1% to about 5%, by weight, relative to the total weight of monomer(s) (e.g., allylic amine compounds and salts thereof) in the reaction mixture. The initiator can be introduced into the reaction mixture as a single addition or as multiple additions during the course of polymerization, and one or more initiators represented by Structural Formula IV can be used in the process of the invention. When multiple initiators are used, they can be added to the reaction mixture simultaneously or at different times during polymerization.

In one embodiment, the process employs a water soluble non-ionic diazo-type free radical initiator represented by Structural Formula IV and one or more additional water soluble initiators. Suitable additional water soluble initiators include, for example, azobis(isobutyronitrile), azobis(4-cyanovaleric acid), 2,2'-azobis(2-amidinopropane) dihydrochloride, potassium persulfate, ammonium persulfate, and potassium hydrogen persulfate. In another embodiment, a water soluble non-ionic initiator represented by Structural Formula IV is used in the process of the invention in conjunction with ionizing radiation or ultraviolet light.

In one embodiment, the reaction mixture can comprise other salts in addition to the allylic amine salt (e.g., inorganic acid and/or metal salts (e.g., zinc chloride, calcium chloride, magnesium chloride)). Preferably, the total amount of such salts is less than 5% by weight. More preferably, no additional salts are added to the reaction mixture, thus, the reaction mixture is essentially free of additional salts (e.g, inorganic acid salts, metal salts, organic acid salts).

The polymerization of allylic amine compounds can be inhibited by oxygen. Thus, in a preferred embodiment, the oxygen content of the reaction solvent is reduced. Suitable methods for reducing the oxygen content (degassing) of an aqueous solution are known in the art and include, for example, bubbling an inert gas (e.g., argon, nitrogen) through the solution and maintaining the solution under reduced pressure. Preferably, the reaction mixture is maintained under an inert atmosphere (e.g., nitrogen, argon) after the oxygen content has been reduced.

The polymerization reaction is maintained at a suitable temperature for an amount of time suitable for polymerization to occur. For example, the reaction can be maintained at a temperature of about 50° C. to about 120° C. for a period of about 0.5 to about 50 hours. In a preferred embodiment, the reaction is maintained at a temperature of about 70° C. to about 120° C. Preferably, the reaction is maintained at the desired temperature for a period of time which is sufficient to allow conversion of about 80% or more of the allylic amine compound into polymers. Polymers produced in accordance with the process of the invention can be recovered using any suitable method, such as precipitation and/or filtration.

Polymerization of allylic amines in accordance with the invention (i.e., utilizing a water soluble non-ionic diazo-type free radical initiator) provides advantages over other polymerization processes (e.g., utilizing a cationic diazo-type free radical initiator). For example, as described in the Examples, the process of the invention can be used to obtain higher conversion of monomers and increased yields of product in comparison with processes utilizing a cationic diazo initiator (compare, for example, Examples 1 and 2 (Table 1), Examples 29 and 33 (Table 7), Examples 39 and 42 (Table 9)).

EXAMPLES

Polymerization of Allylamine

An aqueous solution of allylamine hydrochloride was added to a 50 mL round-bottomed flask, and the water soluble non-cationic free radical initiator, 2,2'-azobis[2-methyl-N-(2-hydroxyethyl)propionamide], or the water soluble cationic free radical initiator, 2,2'-azobis(2-amidinopropane) dihydrochloride, which is available under the trade name V-50 (Wako Chemicals USA, Inc., Richmond, Va.), was added to the solution. The oxygen content of the solution was reduced by evacuating the flask three times to a pressure equal to the vapor pressure of the reaction mixture and holding at that pressure for 5 min. The flask was then filled with nitrogen. Following polymerization, the polymer was precipitated from the viscous solution by adding it to 200 mL of stirred methanol. The precipitated polymer was recovered by filtration, washed, and dried overnight under vacuum at room temperature.

TABLE 1

Polymerization of allylamine with 2,2'-azobis[2-methyl-N-(2-hydroxyethyl)propionamide] or 2,2'-azobis(2-amidinopropane)

| Example | Initiator | allylamine · HCl (g) | Time (h) | Temperature (° C.) | Yield (g) | Conversion (%) | Mn | MWD |
|---|---|---|---|---|---|---|---|---|
| 1 | 2,2'-azobis(2-amidinopropane) (1 mmol) | 7.21 | 24 | 50 | 3.65 | 50.6 | | |
| 2 | 2,2'-azobis[2-methyl-N-(2-hydroxyethyl)propionamide] (1 mmol) | 7.21 | 18 | 80 | 5.01 | 69.4 | | |
| 3 | 2,2'-azobis[2-methyl-N-(2-hydroxyethyl)propionamide] (2 mmol) | 14.42 | 10.5 | 85 | 12.3 | 85.3 | 33,000 | 2 |
| 4* | 2,2'-azobis[2-methyl-N-(2 hydroxyethyl)propionamide] (1 mmol) | 7.21 | 24 | 80 | 4.02 | 55.7 | | |

Conditions: 10 mL H$_2$O plus 70% allylamine hydrochloride solution in water (by weight).
*0.2 g sodium pyrophosphate decahydrate was added to the reaction solution.
Mn: number average molecular weight; MWD: molecular weight distribution

TABLE 2

The effect of temperature on allylamine polmerization

| Example | Temperature (° C.) | Time (h) | Yield (g) | allylamine · HCl polymerized (%) |
|---|---|---|---|---|
| 5 | 95 | 2 | 4.80 | 70.6 |
| 6 | 100 | 2 | 4.92 | 72.4 |
| 7 | 105 | 2 | 5.35 | 78.7 |

Monomer: 8.5 g of 80% allylamine hydrochloride solution in water (by weight)
Initiator: 2,2'-azobis[2-methyl-N-(2-hydroxyethyl)propionamide], 1 mmol.

TABLE 3

Conversion versus monomer concentration allylamine · HCl

| Example | quantity (g) | concentration (% of total weight of reaction solution) | Time (h) | Yield (g) | allylamine · HCL polymerized (%) |
|---|---|---|---|---|---|
| 8 | 7 | 60% | 4 | 6.63 | 94.7 |
| 9 | 7 | 70% | 4 | 6.08 | 86.9 |
| 10 | 7 | 80% | 4 | 5.08 | 72.6 |

Initiator: 2,2'-azobis[2-methyl-N-(2-hydroxyethyl)propionamide], 1 mmol
Temperature: 95° C.

TABLE 4

Conversion versus polymerization time allylamine · HCl

| Example | quantity (g) | concentration (% of total weight of reaction solution) | T (° C.) | Time (h) | Yield (g) | allylamine · HCl polymerized (%) |
|---|---|---|---|---|---|---|
| 11 | 7 | 70% | 105 | 1 | 4.62 | 66.0 |
| 12 | 7 | 70% | 105 | 2 | 5.82 | 83.1 |
| 13 | 7 | 70% | 105 | 4 | 6.35 | 90.7 |
| 14 | 7 | 70% | 105 | 7 | 6.64 | 94.9 |
| 15 | 7 | 60% | 105 | 1 | 5.40 | 77.1 |
| 16 | 7 | 60% | 105 | 2 | 5.78 | 82.6 |
| 17 | 7 | 60% | 105 | 4 | 6.40 | 91.4 |
| 18 | 7 | 60% | 105 | 7 | 6.96 | 97.4 |

Initiator: 2,2'-azobis[2-methyl-N-(2-hydroxyethyl)propionamide], 1 mmol.

The data presented in Table 4 reveal the relationship between conversion of allylamine monomers into polymers and polymerization time. These data are presented graphically in the FIGURE.

TABLE 5

Effect of pH on % conversion at constant temperature

| Example | pH | Conversion (%)* |
|---|---|---|
| 19 | −0.53 | 62.7 |
| 20 | −0.15 | 82.6 |
| 21 | +0.27 | 86.7 |
| 22 | +0.42 | 87.7 |
| 23 | +0.85 | 79.1 |
| 24 | +1.02 | 77.2 |

Monomer: 10 g of 60% allylamine hydrochloride solution in water (by weight);
Initiator: 2,2'-azobis[2-methyl-N-(2-hydroxyethyl)propionamide], 0.24 g
Temperature: 105° C.
Time: 24 hours
*Assessed by $^1$H-NMR

TABLE 6

Effect of temperature on % conversion at constant pH

| | Time (h) | Conversion (%)* | $M_w$ |
|---|---|---|---|
| Example 25 (90° C.) | | | |
| Sample 1 | 18 | 84.1 | |
| Sample 2 | 24 | 89.0 | |
| Sample 3 | 42 | 87.0 | |
| Sample 4 | 50 | 87.5 | 6633 |
| Example 26 (100° C.) | | | |
| Sample 1 | 18 | 87.1 | |
| Sample 2 | 24 | 90.2 | |
| Sample 3 | 42 | 85.8 | |
| Sample 4 | 50 | 88.4 | 7932 |
| Example 27 (105° C.) | 48 | 78.9 | |
| Example 28 (90° C.) | 48 | 82.7 | 4201 |

Examples 25 and 26:
Monomer: 10 g of 60% allylamine hydrochloride solution in water (by weight)
Initiator: 2,2'-azobis[2-methyl-N-(2-hydroxyethyl)propionamide], 0.3 g pH = 0.45
Examples 27 and 28:
Monomer: 10 g of 40% allylamine hydrochloride solution in water (by weight)
Initiator: 2,2'-azobis[2-methyl-N-(2-hydroxyethyl)propionamide], 0.2 g pH = 0.42
*Aliquots of Examples 25 and 26 were removed at the indicated times and analyzed by $^1$H-NMR. It appeared that no further reaction occurred after 24 h.
$M_w$: weight average molecular weight.

The results presented in Tables 1–6 and in the FIGURE, show that allylamine can be successfully polymerized using the water soluble non-ionic diazo-type free radical initiator 2,2'-azobis[2-methyl-N-(2-hydroxyethyl)propionamide]. Under optimized conditions, near quantitative yields of polyallylamine hydrochloride were obtained.

Polymerization of Diallylamine

An aqueous solution of diallylamine hydrochloride was added to a 50 mL round-bottomed flask, and 2,2'-azobis[2-methyl-N-(2-hydroxyethyl)propionamide] or 2,2'-azobis(2-amidinopropane) was added to the solution. The oxygen content of the solution was reduced by evacuating the flask three times to a pressure equal to the vapor pressure of the reaction mixture and holding at that pressure for 5 min. The flask was then filled with nitrogen. Following polymerization, the polymer was precipitated from the viscous solution by adding it to 200 mL of stirred methanol. The precipitated polymer was recovered by filtration, washed, and dried overnight under vacuum at room temperature.

TABLE 7

Polymerization of diallylamine with 2,2'-azobis[2-methyl-N-(2-hydroxyethyl)propionamide] or 2,2'-azobis(2-amidinopropane)

| | | diallylamine · HCl | | | |
|---|---|---|---|---|---|
| Example | Initiator | quantity (g) | concentration (% of total weight of reaction solution) | T (° C.) | diallylamine · HCl polymerized (%)[a] |
| 29 | 2,2'-azobis(2-amidinopropane) (0.20 g) | 5 | 50% | 60 | 63.6 |
| 30 | 2,2'-azobis(2-amidinopropane) (0.24 g) | 6 | 60% | 60 | 87.8 |
| 31 | 2,2'-azobis(2-amidinopropane) (0.28 g) | 7 | 70% | 60 | 47.8 |
| 32 | 2,2'-azobis(2-amidinopropane) (0.10 g) | 5 | 50% | 60 | 57.9 |
| 33 | 2,2'-azobis[2-methyl-N-(2-hydroxyethyl)propionamide] (0.20 g) | 5 | 50% | 105 | 79.2 | pH = 0.45
Time = 17 hours
[a]Based on $^1$H NMR data

The results presented in Table 7 show that diallylamine can be successfully polymerized using the water soluble non-ionic diazo-type free radical initiator 2,2'-azobis[2-methyl-N-(2-hydroxyethyl)propionamide].

Preparation of copolymers

A described amount of initiator, allylamine•HCl solution and comonomer (diallylamine•HCl, acrylamide) were added to a 50 mL round-bottomed flask with a magnetic stirrer. Oxygen was removed by evacuating the flask three times at a pressure equal to the vapor pressure of the reaction mixture and holding at that pressure for 5 minutes, then the flask was filled with nitrogen. The temperature was controlled using the J-KEM Model 210 instrument. Following polymerization, the polymer was precipitated from the viscous solution by adding it to 200 mL of stirred methanol. The precipitated polymer was recovered by filtration, washed, and dried overnight under vacuum at room temperature.

TABLE 8a

Copolymerization of allylamine and diallylamine with 2,2'-azobis[2-methyl-N-(2-hydroxyethyl)propionamide]

| Example | diallylamine · HCl solution (g) | allylamine · HCl solution (g) | Time (hours) | Yield (g) |
|---|---|---|---|---|
| 34 | 6.6 | 6.6 | 6 | 5.57 |
| 35 | 2 | 9 | 6 | 6.24 |
| 36 | 3.5 | 7.5 | 10 | 6.60 |
| 37 | 7.5 | 3.5 | 10 | 6.50 |
| 38 | 9 | 2 | 6 | 6.48 |

Initiator: 2,2'-azobis[2-methyl-N-(2-hydroxyethyl)propionamide]: 1 mmol
Temperature: 105° C.
Monomers:
Example 34 50% diallylamine · HCl solution water (by weight)
50% allylamine · HCl solution in water (by weight).

TABLE 8a-continued

Copolymerization of allylamine and diallylamine with
2,2'-azobis[2-methyl-N-(2-hydroxyethyl)propionamide]

| Example | diallylamine · HCl solution (g) | allylamine · HCl solution (g) | Time (hours) | Yield (g) |
|---|---|---|---|---|

Examples 35–38 60% diallylamine · HCl solution in water (by weight) 60% allylamine · HCl solution in water (by weight).

TABLE 8b

Copolymerization of allylamine and diallylamine with
2,2'-azobis[2-methyl-N-(2-hydroxyethyl)propionamide]

|  | Example 35 | Example 36 | Example 37 | Example 38 |
|---|---|---|---|---|
| diallylamine/allylamine ratio |  |  |  |  |
| Found | 23/77 | 32/68 | 68/32 | 86/14 |
| Theory | 18/82 | 55/45 | 68/32 | 82/18 |
| Molecular Weight |  |  |  |  |
| Mw | 25000 | 32000 | 46000 | 39000 |
| Mn | 11000 | 12000 | 13000 | 12000 |
| polydispersity (Mw/Mn) | 2.3 | 2.7 | 3.5 | 3.3 |

TABLE 9

Copolymerization of allylamine and acrylamide

| Example | Initiator | allyl amine · HCl (g) | acrylamide (g) | Time (h) | Yield (g) |
|---|---|---|---|---|---|
| 39 | 2,2'-azobis[2-methyl-N-(2-hydroxyethyl)propionamide] (1 mmol) | 6 | 1 | 6 | 5.24 |
| 40 | 2,2'-azobis[2-methyl-N-(2-hydroxyethyl)propionamide] (1 mmol) | 5 | 2 | 6 | 5.49 |
| 41* | 2,2'-azobis[2-methyl-N-(2-hydroxyethyl)propionamide] (1 mmol) | 4 | 3 | 6 | 4.72 |
| 42 | 2,2'-azobis(2-amidinopropane) (1 mmol) | 6 | 1 | 6 | 4.30 |
| 43 | 2,2'-azobis(2-amidinopropane) (1 mmol) | 5 | 2 | 6 | 4.98 |
| 44* | 2,2'-azobis[2-methyl-N-(2-hydroxyethyl)propionamide] (1 mmol) | 3.5 | 3.5 | 5 | 5.92 |

Monomers: allylamine · HCl was added to the reaction vessel as a 60% solution in water (by weight), acrylamide was added to the reaction vessel as a dry solid
Temperature: 100° C.
Example 41: 3 mL H$_2$O added
Example 44: 2 mL H$_2$O added The results presented in Tables 8a, 8b and 9 show that allylamine can be successfully copolymerized using the water soluble non-ionic diazo-type free radical initiator 2,2'-azobis[2-methyl-N-(2-hydroxyethyl)propionamide].

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A process for preparing polymers of allylic amine compounds, comprising:
   a) preparing a reaction mixture comprising:
      i) a polar reaction solvent;
      ii) at least one salt of an allylic amine compound; and
      iii) a free radical initiator comprising a water soluble non-ionic diazo compound represented by:

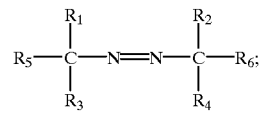

wherein:
$R_1$, $R_2$, $R_3$ and $R_4$ are the same or different lower alkyl groups;
$R_5$ and $R_6$ are each represented by

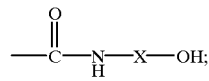

wherein X is a $C_1$ to $C_{12}$ alkylene group; and
   b) maintaining the reaction mixture at a suitable temperature and for a period of time for polymerization to occur.

2. The process of claim 1 further comprising the step of reducing the oxygen content of the reaction mixture.

3. The process of claim 1 wherein said salt of an allylic amine compound is present in an amount of about 40% to about 90% by weight, based upon the total weight of the reaction mixture.

4. The process of claim 1 wherein said salt of an allylic amine compound is present in an amount of about 60% by weight, based upon the total weight of the reaction mixture.

5. The process of claim 1 wherein the allylic amine salt is one or more compounds selected from the group of compounds represented by Structural Formulae I, II and III.

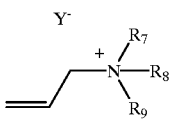

(I)

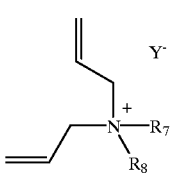

(II)

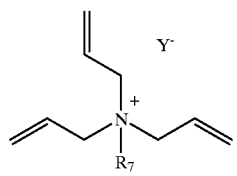

(III)

wherein:
$R_7$, $R_8$ and $R_9$ are each, independently, —H, a substituted or unsubstituted aryl group, a substituted or unsubstituted aralkyl group, a substituted or unsubstituted linear, branched or cyclic alkyl group, or any two of $R_7$, $R_8$ and $R_9$ taken together with the nitrogen atom to which they are bonded form a substituted or unsubstituted four to ten membered heterocyclic ring containing one or more heteroatoms; and $Y^-$ is a negatively charged counter ion.

6. The process of claim 1 wherein the allylic amine salt is a tetraallylammonium salt.

7. The process of claim 1 wherein said reaction mixture further comprises one or more additional monomers that are polymerizable by a free radical addition process selected from allylic monomers, vinylic monomers and multifunctional monomers comprising two or more terminal olefin bonds.

8. The process of claim 7 wherein said additional compounds are selected from the group consisting of acrylic acid, substituted or unsubstituted acrylates, substituted and unsubstituted acrylamides, substituted and unsubstituted methacrylamides and aminoalkyl(meth) acrylates.

9. The process of claim 1 wherein the reaction mixture has a pH of less than about 3.

10. The process of claim 1 wherein the reaction mixture has a pH of less than about 1.

11. The process of claim 1 wherein said salt of an allylic amine compound is an acid addition salt comprising a counter ion selected from the group consisting of chloride, bromide, fluoride, sulfate, sulfite, phosphate and a carboxylate anion.

12. The process of claim 1 wherein said acid addition salt is formed in situ.

13. The process of claim 1 wherein said water soluble non-ionic free radical initiator is present in an amount of about 0.1% to about 10% by weight relative to the total weight of monomers in the reaction solution.

14. The process of claim 1 wherein X is an ethylene group.

15. The process of claim 1 wherein said water soluble non-ionic diazo compound is 2,2'-Azobis[2-methyl-N-(2-hydroxyethyl)propionamide].

16. The process of claim 1 wherein the reaction mixture is polymerized at a temperature of about 70° C. to about 120° C.

17. The process of claim 1 wherein said salt of an allylamine compound is a monoallylamine salt, a diallylamine salt or a mixture thereof.

18. A process for preparing polymers of allylamine, comprising:

a) preparing a reaction mixture comprising:
  i) a polar reaction solvent;
  ii) an allylamine salt; and
  iii) a free radical initiator comprising a water soluble non-ionic diazo compound represented by:

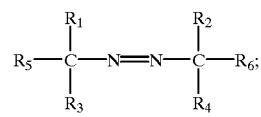

wherein:
$R_1$, $R_2$, $R_3$ and $R_4$ are the same or different lower alkyl groups;
$R_5$ and $R_6$ are each represented by

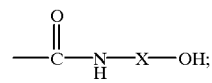

wherein X is a $C_1$ to $C_2$ alkylene group;

b) maintaining the reaction mixture at a suitable temperature and for a period of time for polymerization to occur.

19. The process of claim 18 further comprising the step of reducing the oxygen content of the reaction mixture.

20. The process of claim 18 wherein said allylamine salt is present in an amount of about 40% to about 90% by weight, based upon the total weight of the reaction mixture.

21. The process of claim 18 wherein said allylamine salt is present in an amount of about 60% by weight, based upon the total weight of the reaction mixture.

22. The process of claim 18 wherein reaction mixture has a pH of less than about 3.

23. The process of claim 18 wherein the reaction mixture has a pH of less than about 1.

24. The process of claim 18 wherein said allylamine salt is an acid addition salt selected from the group consisting of allylamine hydrochloride, allylamine hydrobromide, allylamine hydrofluoride, allylamine sulfate, allylamine sulfite, allylamine phosphate and allylamine acetate.

25. The process of claim 18 wherein said acid addition salt is formed in situ.

26. The process of claim 18 wherein said water soluble free radical initiator is present in an amount of about 0.1% to about 10% by weight relative to the total weight of monomers in the reaction solution.

27. The process of claim 18 wherein X is an ethylene group.

28. The process of claim 18 wherein said water soluble non-ionic diazo compound is 2,2'-Azobis[2-methyl-N-(2-hydroxyethyl)propionamide].

29. The process of claim 1 wherein the reaction mixture is polymerized at a temperature of about 70° C. to about 120° C.

* * * * *